Figure 1:
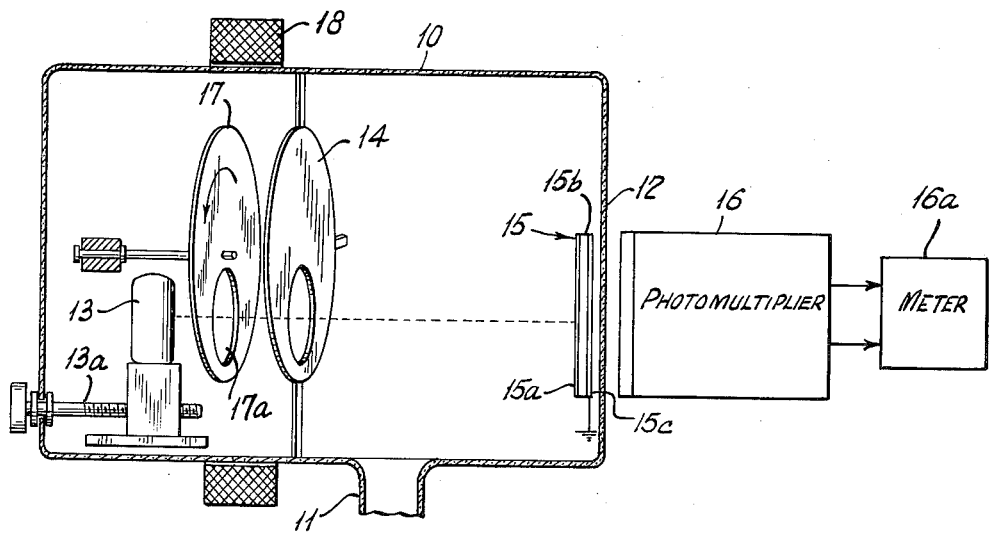

March 13, 1962  R. D. LAUGHLIN  3,025,396
RADIOISOTOPE PRESSURE TRANSDUCER
Filed Sept. 22, 1958

INVENTOR.
ROBERT D. LAUGHLIN
BY
Mitchell & Bechert
ATTORNEYS

United States Patent Office 3,025,396
Patented Mar. 13, 1962

3,025,396
RADIOISOTOPE PRESSURE TRANSDUCER
Robert D. Laughlin, Boalsburg, Pa., assignor by mesne assignments, to HRB-Singer, Inc., State College, Pa., a corporation of Delaware
Filed Sept. 22, 1958, Ser. No. 762,522
4 Claims. (Cl. 250—43.5)

My invention relates to the measurement of gas pressures. More particularly it relates to new and improved methods and inertia-free transducer apparatus for measuring gas pressures ranging from atmospheric to hard vacuum.

With the advent of high altitude aircraft and missiles operating in the near space region, there has developed a need for new and improved pressure and density instrumentation. Pressure transducer instruments having moving elements such as diaphragms, Bourdon tubes, and mechanical linkages with their attendant friction loads and relatively high inertia are generally lacking in sensitivity and accuracy. Another and basically different type of pressure transducer instrument is based on the measurement of physical phenomena such as gaseous ionization. These instruments do not depend on the energy transfer from moving molecules to a movable linkage and are capable, therefore, of achieving adequate sensitivity and accuracy, but generally speaking they are costly, require expensive, well-regulated power sources and, in many cases, have an unsatisfactorily brief working life, particularly when operated in the atmospheric pressure ranges.

Accordingly, it is one object of the present invention to provide an improved method and transducer apparatus for measuring gas pressures.

Another object of the invention is to provide new improved, friction and inertia free apparatus for obtaining accurate indications of gas pressure.

Another object of the invention is to provide an improved method and apparatus for measuring wide ranges of gas pressure.

In accordance with the present invention, pressure measurements are obtained by utilizing physical properties of the gas fluid and without requiring that mechanically movable parts be driven by extracting energy from moving gas molecules. In a preferred embodiment of the invention a specimen of the gas is subjected to controlled irradiation by high energy particles such as alpha particles. The particles are directed, as by an apertured mask, through a measured gas track, and the energy content of the particles at the receiving point is measured. The measurement can be made by means of a member responsive to the energy content of the particles to produce light energy such, for example, as a phosphorescent barrier. When the gas interposed in the space between the source and the phosphorescent barrier is relatively dense, the glow or degree of light emission from the barrier will be relatively reduced due to loss of alpha particle energy. Thus, there is furnished a direct and linear indication of the concentration of gas molecules in the space. The light energy generated in the phosphorescent surface by the energy-degraded particles is measured by suitable means, such as a photomultiplier tube. The instrument can take the form of a closed envelope adapted to be connected to a source of gas to be measured and containing an alpha particle source such as the radioisotope radium 226 and, spaced therefrom, a phosphor coated surface, preferably glass or other light transparent material. The spacing between the elements can be made adjustable to afford responses to various pressure ranges. Also, a mechanical shutter assembly can be placed between the alpha particle source or emitter and the phosphorescent surface in order to provide an alternating current output which is capable of efficient amplification.

Figure 2:
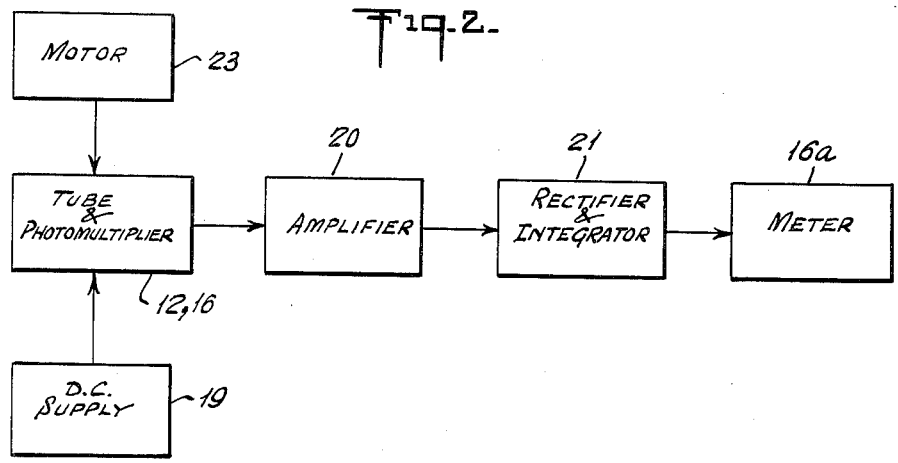

A preferred embodiment of the invention from which the above and other features and objects will be readily understood is described below having reference to the accompanying drawings, in which:

FIGURE 1 is a schematic diagram of a simplified apparatus for obtaining an indication of gas pressure; and FIGURE 2 is a block diagram illustrating an alternating current system for measuring pressure.

Referring to the drawings, the invention is illustrated as embodied in a system including a gas containing or sampling system including a closed envelope 10 having a connector 11 to be coupled to the source of gas pressure to be measured and preferably having at least one light transparent wall 12. If desired, the entire envelope 10 can be formed of glass. Mounted within the envelope 10 is source 13 of high energy radiation such as a radioisotope source of alpha particles. Radium 226 and its equilibrium daughter products or $_{84}Po^{210}$ are examples of sources of alpha particle emission in the high energy, e.g., circa 5 mev., range. Alpha particle radiation from the source 13 is controlled and directed by an apertured plate or mask 14, preferably disposed close to the source 13.

Disposed within the envelope 10 at a point remote from the source 13 and the radiation controlling plate 14 is radiation responsive means 15 such as a scintillator screen with a phosphor concentration 15a capable of emitting light energy as a function of the energy of the particles incident thereon. Zinc sulphide activated with an impurity such as silver, ZnS(Ag), constitutes a useful scintillator screen material. Alternatively, alkali halides or organic materials can be used. The radiation responsive means 15 is preferably supported by a light transparent surface such as glass or plastic 15b or can be supported by the inside surface of the light transparent wall 12 of the envelope 10. The scintillator screen is electrostatically shielded by grounding its conducting transparent film 15c.

Disposed outside of the envelope 10 closely adjacent the radiation-responsive, light-emitting means 15 is a light-measuring device such, for example, as a phototube 16. The phototube 16, in a preferred arrangement of this invention, is a photomultiplier tube such as an RCA 6199 tube capable of producing an electrical voltage output in response to the light radiation which is substantially linear, and the output can be read from a suitable indicator or meter 16a. The elements including the emitter or source 13 and the radiation responsive means 15 are relatively adjustable within the envelope 12, as by use of a lead screw 13a to shift the source toward or away from the light-emitting means 15, to vary the length of the track for the particles through the gas to be measured. It has been discovered that optimum measurements in any given pressure range can be achieved by this adjustment. The apertured plate 14 should be kept, in general, as close to the source 13 as possible. Space charge accumulation within the system is reduced by the grounded, transparent, electrically conducting film 15c on the scintillator screen 15.

If alternating current amplification is preferred to direct current amplification in the electrical system, an alternating current characteristic can be introduced by mounting a mechanical shutter such as an apertured disc 17 in the envelope 10 for rotation about an axis spaced from the axis of alpha particle transmission from the source 13 to the radiation responsive means 15. The shutter 17 includes an aperture 17a which passes through the axis of the particle radiation once for each rotation, thereby chopping the beam to create an alternating electrical output in the phototube 16. The mechanical shutter 17 can be driven by a suitable motor mounted within the envelope 10, or, alternatively, it can be driven as the armature of an electric motor inductively coupled through the envelope 10 to a field structure 18 surrounding the envelope.

Referring to FIGURE 2, there is illustrated a block diagram showing a typical A.C. system in which the phototube 16 is energized from a D.C. supply 19, with the modulated output of the phototube 16 being amplified by an A.C. amplifier 20. The output of the amplifier 20 is passed through a rectifier and integrator 21 to yield a D.C. output for energizing the indicator 16a. The system is completed by a power source 23 for driving the shutter 17. The amplified and rectified D.C. output appearing in the meter 16a will be directly proportional to the gas pressure in the envelope 10.

In operation, assuming a complete absence of gas molecules between the source 13 and the light-emitting member 15, a maximum number of alpha particles of maximum energy will reach the member and a maximum light intensity will be generated thereby. With increased gas pressure within the envelope 10, that is, increased gas molecules interposed in the track of the particles, less particle energy will be received by the member 15, and the light intensity or glow will be correspondingly diminished. The electrical current output of the photomultiplier tube 16 will vary, therefore, in inverse proportion to the concentration of gas molecules, and an indication is thereby obtained of gas pressures.

The gas pressure is measured by comparing the output response of the system for the gaseous medium under investigation with that of a plot obtained from a standard sample which had been previously calibrated. If density is the desired information, known mathematical laws of transformation may be applied to find this factor.

In a representative system formed in accordance with the invention, an alpha particle emitter was spaced approximately 1.50 inches from the radiation-responsive means or scintillator 15 and the phototube 16 was in close optical contact with the scintillator. A sensitivity of about 2.5 volts/cm. of mercury pressure difference was achieved. This voltage was produced directly across a load resistor in the anode circuit of the phototube, which afforded an output voltage of about 80 volts D.C.

While the invention has been described above having reference to certain specific embodiments thereof, it will be understood that it can take various other forms and arrangements and should not, therefore, be regarded as limited except as defined in the following claims.

I claim:

1. Transducer apparatus for measuring the pressure of a gas, comprising an enclosure having at least one transparent wall and a connection for feeding the gas into the enclosure space for measurement, a source of alpha particles disposed within said enclosure remote from said transparent wall for producing radiant emissions, a scintillator screen disposed within said enclosure in spaced axial relationship to said source and contiguous to said transparent wall, a mask positioned in close proximity to said source and having an aperture therein for directing said emissions in a controlled beam of particles through the gas in said space at said screen, said screen including plane surface means for responding to said particles for emitting light energy as an inverse function of the intensity of the particles traversing said space through the gas to said screen, photomultiplier means positioned adjacent the outside of said transparent wall for producing a voltage output proportional to said light energy, and means responsive to said voltage output for indicating gas pressure.

2. The apparatus of claim 1, and further comprising means for adjusting the spacing between said source and screen to vary the traversing length of said particles thereby varying the range of pressure measurement.

3. The apparatus of claim 1, wherein said scintillator screen also includes light transmissive ground connected electrically conductive means positioned between the particle responsive means and said photomultiplier means for reducing space charge accumulations within said enclosure.

4. The apparatus of claim 1, and further comprising mechanically driven shutter means positioned in the path of said emissions for producing an alternating current voltage output from said photomultiplier means.

References Cited in the file of this patent

UNITED STATES PATENTS

| | | |
|---|---|---|
| 2,735,944 | Greer | Feb. 21, 1956 |
| 2,759,107 | Armistead | Aug. 14, 1956 |
| 2,817,764 | Jacobs et al. | Dec. 24, 1957 |
| 2,824,246 | Keller | Feb. 18, 1958 |
| 2,873,377 | McKay | Feb. 10, 1959 |
| 2,908,819 | Marx | Oct. 13, 1959 |